US007728770B2

(12) United States Patent
Kinghorn et al.

(10) Patent No.: US 7,728,770 B2
(45) Date of Patent: Jun. 1, 2010

(54) ANTENNA

(75) Inventors: Anthony Miles Kinghorn, Edinburgh (GB); Robert Longmuir Sinclair, Edinburgh (GB); John Stephen Tanner, Edinburgh (GB)

(73) Assignee: Selex Galileo Ltd., Basildon, Essex (GB)

( * ) Notice: Subject to any disclaimer, the term of this patent is extended or adjusted under 35 U.S.C. 154(b) by 66 days.

(21) Appl. No.: 11/349,264

(22) Filed: Feb. 8, 2006

(65) Prior Publication Data

US 2007/0146202 A1 Jun. 28, 2007

(30) Foreign Application Priority Data

Dec. 23, 2005 (EP) .................................. 05270104
Dec. 23, 2005 (GB) ................................. 0526219.1

(51) Int. Cl.
*H01Q 3/00* (2006.01)
*G01S 7/36* (2006.01)

(52) U.S. Cl. ........................................ 342/368; 342/16

(58) Field of Classification Search .................. 342/368
See application file for complete search history.

(56) References Cited

U.S. PATENT DOCUMENTS 2,867,804 A * 1/1959 Gihring ...................... 343/853
4,749,997 A * 6/1988 Canonico .................... 343/705
5,079,557 A 1/1992 Hopwood et al.
5,357,259 A 10/1994 Nosal
5,479,176 A * 12/1995 Zavrel, Jr. ................... 342/374
5,781,157 A * 7/1998 Laird ......................... 342/379
6,195,060 B1 * 2/2001 Spano et al. ................ 343/766
6,340,949 B1 1/2002 Lane et al.
6,380,908 B1 * 4/2002 Andrews et al. ............ 343/853
7,317,427 B2 * 1/2008 Pauplis et al. ............... 343/853
2002/0105928 A1 * 8/2002 Kapoor et al. .............. 370/334
2002/0135513 A1 * 9/2002 Paschen et al. .............. 342/371
2004/0252059 A1 * 12/2004 Zaghloul et al. ...... 343/700 MS
2005/0017917 A1 * 1/2005 Park et al. .................. 343/824
2006/0164284 A1 * 7/2006 Pauplis et al. ................ 342/16

FOREIGN PATENT DOCUMENTS

FR 2741478 A1 5/1997
GB 2 398 429 A 8/2004
GB 2398429 A 8/2004

OTHER PUBLICATIONS

European Search Report dated Jun. 7, 2006 (Seven (7) pages).
Great Britain Search Report dated Mar. 13, 2006 (Three (3) pages).

* cited by examiner

*Primary Examiner*—Thomas H Tarcza
*Assistant Examiner*—Harry Liu
(74) *Attorney, Agent, or Firm*—Crowell & Moring LLP

(57) ABSTRACT

This invention relates to reducing the complexity and cost of antenna arrays and is more specifically concerned with reducing the complexity of an antenna apparatus (10). It provides an antenna array (62) made up of a vertical stack of horizontal linear structures (74) each having several groups of neighboring array antenna elements (78), the groups (74) having variable numbers of the antenna elements (78) each connected to a transmit/receive module (66). The advantage of this configuration is that less communication modules (66), such as transmit/receive modules, are required to operate the antenna array (62), reducing the weight, power consumption and cost of an antenna apparatus (10) incorporating such an antenna array (62) without significantly limiting the capability and/or performance of a system compared to a conventional solution.

20 Claims, 4 Drawing Sheets

ANTENNA

This invention is concerned with reducing the complexity and cost of antenna arrays.

BACKGROUND OF THE INVENTION

Phased array antennas are well known in the art but their adoption has been limited primarily due to their high cost. This is principally because, in most current implementations, each phased array antenna element is linked to a single (expensive) transmit/receive module. Some antenna configurations are known in the art which can reduce the number of modules, but these configurations typically suffer severe limitations in performance and/or functionality.

SUMMARY OF THE INVENTION

Accordingly, the present invention provides an antenna array comprising: a plurality of phased array antenna elements, wherein the phased array antenna elements are arranged in groups, each said group comprising a variable number of the antenna elements; a plurality of communication modules, wherein each communication module is connected to one of said groups of antenna elements.

The advantage of the present invention is that it can reduce the cost of a phased array antenna.

The present invention can also provide an antenna wherein the groups of antenna elements are arranged in a plurality of sub-arrays. Further, the present invention can also provide an antenna wherein each said sub-array has a phase centre and said phase centres are arranged in an irregular configuration The present invention can also provide an antenna wherein each said group of antenna elements comprises at least two said antenna elements.

Further, the present invention can provide an antenna array wherein the groups of phased array antenna elements are provided on linear structures. In the following description, the shorthand "plank" is used in place of the term "linear structures" and is intended to define a section of the array containing a row, or rows, of antenna elements.

Still further, the present invention can also provide an antenna array wherein the planks are removable from the array.

Further, the present invention can also provide an antenna array wherein the communication modules are transmit/receive modules. It is conceivably possible for the communication modules to be either solely transmit or solely receive modules.

Further still, the present invention can also provide an antenna array further comprising: an antenna housing; a drive shaft connected at a first end to the antenna housing and at another end to an aircraft body; and a rotary joint disposed along the drive shaft for coupling therethrough electrical power, radio frequency and control signals to the antenna array; wherein the drive shaft is operable to rotate the antenna assembly through 360°.

This above arrangement provides a phased array antenna with a larger scan area, as the array can rotate.

Further, the present invention can also provide an antenna array wherein the antenna is housed within a radome.

BRIEF DESCRIPTION OF THE DRAWINGS

Specific embodiments of the invention will now be described, by way of example only and with reference to the accompanying drawings that have like reference numerals, wherein:—

In a specific embodiment of the present invention, shown in FIGS. 1 to 4, there is provided an antenna array apparatus 10 for use on an aircraft.

Figure 1:
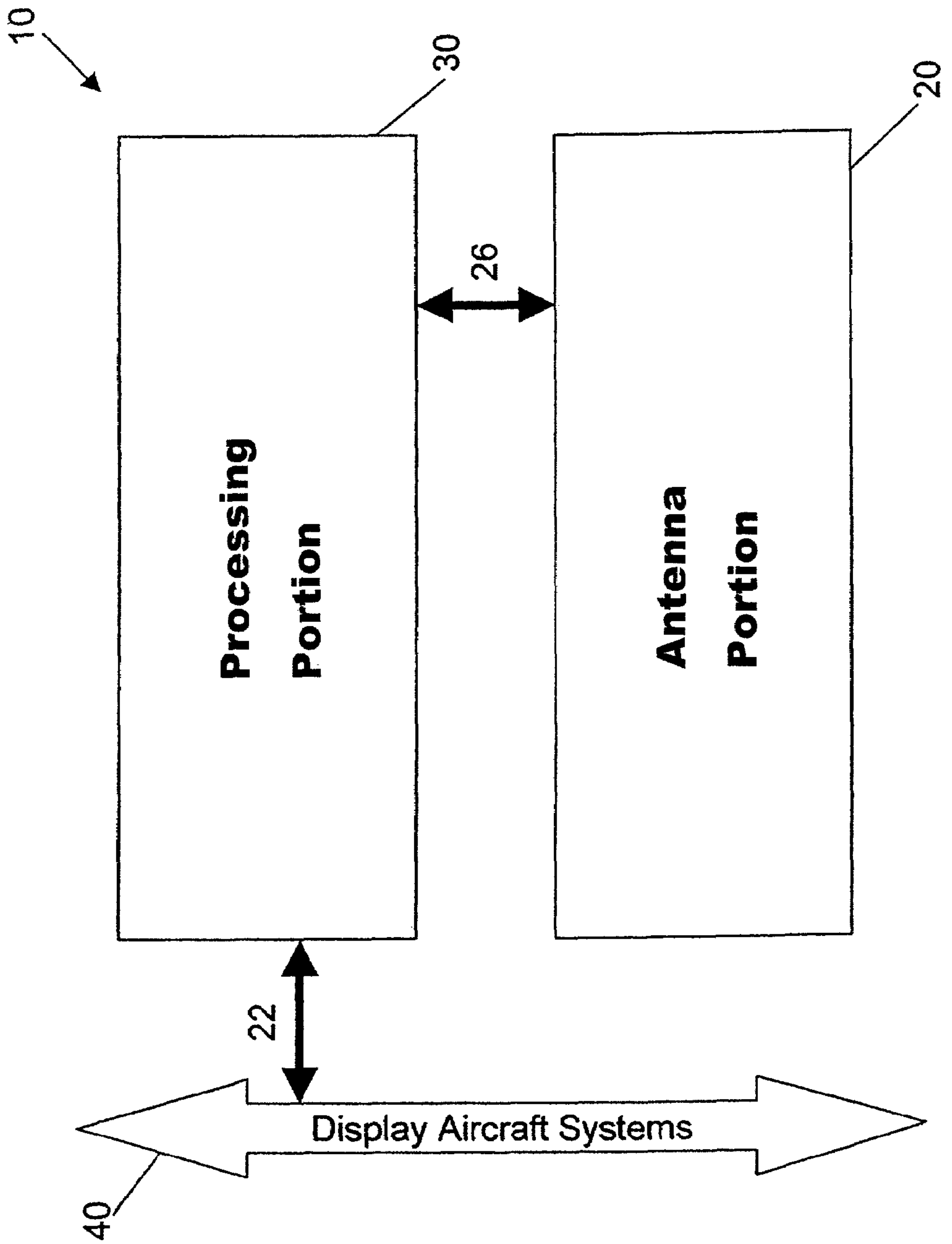
FIG. 1 shows a block diagram showing the basic structure of the system shown in FIG. 1.

Referring to FIG. 1, the antenna array apparatus 10 has two main portions: an antenna portion 20 and a processing portion 30. The antenna portion 20 is in communication with the processing portion 30, shown in FIGS. 2, 3 and 4 by arrow 26. The processing portion 30 is in communication, shown in the Figures by arrow 22, with other systems in the aircraft through an interface 40. The complete system will comprise further apparatus not shown in the Figures, such as a cooling means for example. Such further apparatus, as required, will be evident to a person skilled in the art and needs no further description here. The processing portion 30 provides all of the computing resources required for signal processing, control and interfaces to the antenna.

Figure 2:
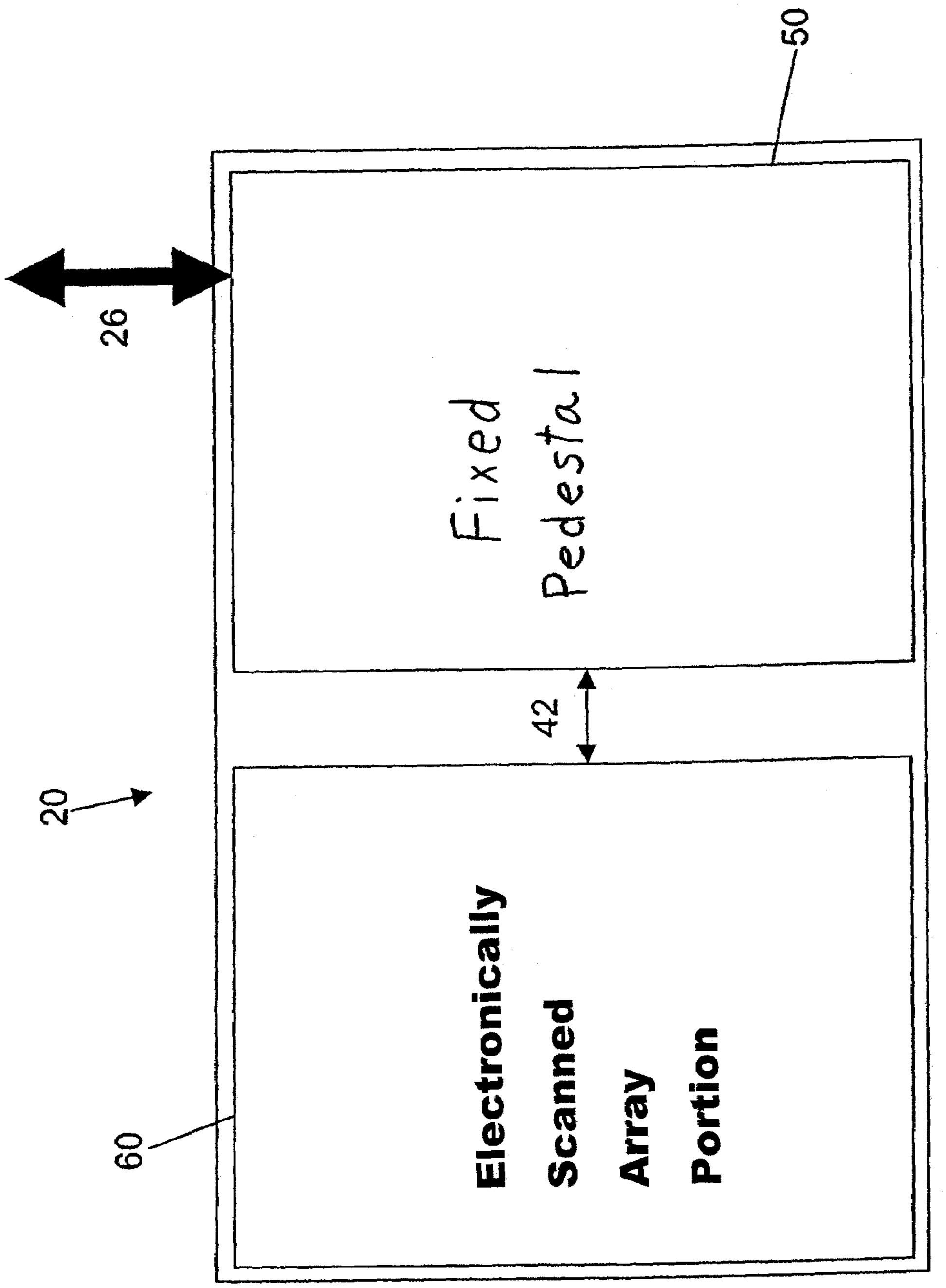
FIG. 2 shows a more detailed block diagram of the antenna portion of the apparatus shown in FIG. 1.

Referring to FIG. 2, where a schematic of the antenna portion 20 shows it in more detail, the antenna portion 20 itself contains two portions: a rotating active electronically scanned array portion 60; and a fixed pedestal 50. In this embodiment, the rotating active electronically scanned array portion 60 rotates mechanically in the azimuth plane. The active electronically scanned array portion 60 and fixed pedestal 50 are in communication with each other, as illustrated in FIG. 2 by arrow 42. The active electronically scanned array portion 60 is controlled from the processing portion 30 (shown in FIG. 1) through communicating via arrow 26, through the fixed pedestal 50 and via arrow 42.

All connections from the processing portion 30 to the active electronically scanned array portion 60 are made via the fixed pedestal 50. The pedestal 50 includes the mechanical structure to fix the active electronically scanned array portion 60 to the aircraft and provides mechanical support as well as housing the power supplies and wiring necessary for control signals and the like. The active electronically scanned array portion 60 can thus be controlled to scan or point in a desired position.

In this embodiment, the pedestal 50 is able to rotate the active electronically scanned array portion 60 in either direction in the azimuth plane.

Figure 3:
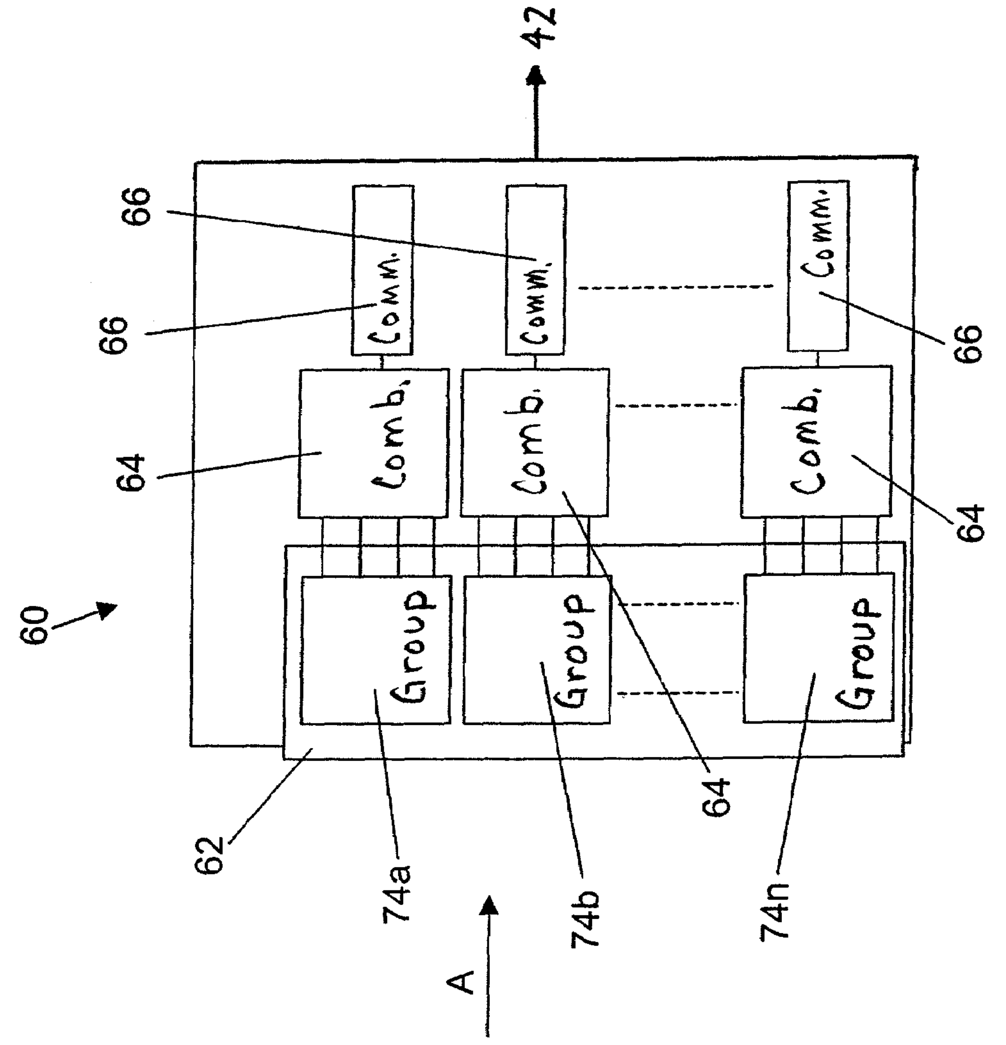
FIG. 3 shows a more detailed block diagram of the antenna array assembly of the antenna portion shown in FIG. 2.
Figure 4:
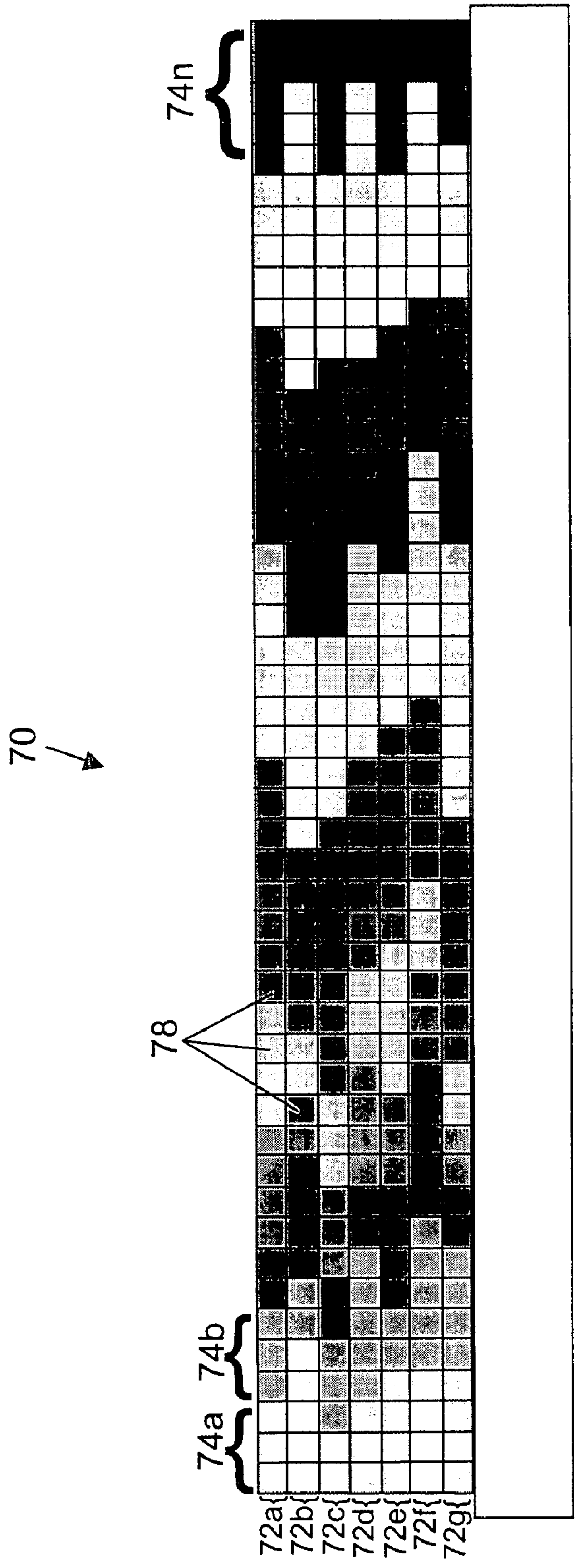
FIG. 4 shows a more detailed diagram of the front face of an array of antennas shown in FIG. 3 when viewed in the direction of arrow A.

Referring now to FIGS. 3 and 4, the principal component of the active electronically scanned array portion 60 is a solid state active electronically scanned array 62.

The active electronically scanned array 62 has a single rectangular array face 70, as shown in FIG. 4, comprising a vertical stack of horizontal planks 72*a* to 72*g*. Each plank 72 contains a horizontal strip of radiating elements 78 and transmit/receive modules 66. Each plank 72 also contains distributed power supplies, control components and distribution boards for RF, power and control signals but these are not shown in the Figures.

In this embodiment, each transmit/receive module 66 is connected to a horizontal strip 74 of radiating elements 78 via a combiner 64, made up of between two and eight radiating elements 78. This is shown in FIG. 3, where each combiner 64 is connected to exemplary groups 74*a*, 74*b* and 74*n* (also indicated on FIG. (4) having different numbers of radiating elements 78. The active electronically scanned array 62 has various connections, located on the rear of the planks 72 (not shown in the Figures), including connections for distribution of the control signals, power supply and elevation RF combiners for the array 62. Accordingly, the active electronically scanned array 62 provides full elevation electronic scanning and limited azimuth electronic scanning compared to a conventional array where each radiating element would be connected to a transmit/receive module 66.

The array face is divided up into sub-arrays, which are the stacks of grouped radiating elements. The sub-array pattern of the active electronically scanned array 62 must be configured to maximise its ability to scan in azimuth and to minimise antenna side-lobe levels. This is accomplished by arranging the phase centres of each sub-array such that they are irregularly spaced. The sub-array pattern is created by configuring the numbers per group 74 of radiating elements 78 in each horizontal strip 72 of radiating elements 78 and the arrangement of horizontal strips 74 of radiating elements differently on each plank 72. This prevents a regular pattern of phase centres of the sub-arrays.

The angular beam width of the array 62 will be determined by the physical size of the array in accordance with standard antenna theory, while the useful area over which the array can utilise beam steering is limited by the size of the largest group 74 of elements 78.

The skilled person will appreciate that the apparatus 10 can be configured in a standard manner, such that it can be set up in the same way as would a conventional phased array.

A further benefit arises from this configuration of the array face 70 when changing planks 72, for example when performing maintenance, as a defective or broken plank 72 can be removed and replaced with a generic plank 72 without significantly compromising the performance of the array 62. This is due to the effectively random positioning of horizontal strips 74 of radiating elements 78, providing that there is no significantly similar groupings of horizontal strips 74 of radiating elements 78 on the adjacent planks 72, relative to the remaining planks 72 in the array 62, of such a generic plank 72.

This simplified configuration of the active electronically scanned array 62 addresses the problems of the prior art as discussed above because, as each transmit/receive module 66 is connected to two or more radiating elements 78, the weight, cost and power consumption of the antenna array apparatus 10 is reduced as less transmit/receive modules 66 are required to provide an acceptable performance level in azimuth scanning. With this arrangement, however, full elevation scanning is still provided for when using this array configuration, as each plank 72 is fully serviced by transmit/receive modules 66 in the vertical direction. Further, as transmit/receive modules 66 are expensive components, relative to the rest of the components within the apparatus 10, the cost of the apparatus 10 will be reduced if less transmit/receive modules 66 are needed.

The configuration also enables the antenna housing (not shown in the Figures) to be designed more aerodynamically, reducing the amount of drag created by mounting the antenna array apparatus 10 externally to the aircraft.

The skilled person would readily appreciate that the above embodiment can be altered without departing from the scope of present invention defined by the claims. For instance, various polarisations, modulations, frequencies and/or bandwidths can be utilised within the scope of the present invention. Alternatively, or in addition, a similar array configuration according to the present invention can conceivably be used in land, sea, air or space based roles. Further still, as an alternative or in addition, it is not necessary for the array of the present invention to rotate or move, and it can conceivably be configured for operation in a fixed position.

Further, should the array not need full elevation scanning, two or more radiating elements 78 could be grouped into a vertical strip and connected to one transmit/receive module 66 instead of, or as well as, having horizontal strips 74 of radiating elements 78 connected to one transmit/receive module 66.

The skilled person would also appreciate from the above description that, though each communications link is shown by a single bi-directional arrow (e.g. arrow 26), it is possible for the elements of the apparatus 10 to communicate in many different configurations, for example by using more than one physical connection.

It should also be appreciated by the skilled person that, though the above described embodiment is arranged as two portions in communication with one another, it is possible for an antenna array according to the present invention to be constructed having just one portion or a multitude of portions.

The shape and arrangement of the array may differ from the example given above, where the array is rectangular. Conceivably, the array could be round, square or irregularly shaped depending on where it needs to fit, for instance within a radome with limited space.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An antenna array comprising:

a plurality of phased array radar processing antenna elements that are arranged in groups of elements defining sub-arrays, each of the sub-arrays comprising horizontal strips of said antenna elements with a variable number of the antenna elements in the horizontal strips of each group; and a plurality of communication modules;

wherein each communication module is connected to the antenna elements within a respective one of said groups of antenna elements; and wherein each of the groups is driven with a common signal.

2. An antenna array according to claim 1, wherein the sub-arrays all include the same number of antenna element rows.

3. An antenna array according to claim 2, wherein each said sub-array has a phase center and said phase centers are arranged in an irregular configuration.

4. An antenna array according to claim 3, wherein each said group of antenna elements comprises at least two of said antenna elements.

5. An antenna array according to claim 4, wherein the groups of phased array antenna elements are provided on lateral structures.

6. An antenna array according to claim 5, wherein the lateral structures are removable from the array.

7. An antenna array according to claim 6, wherein the communication modules are transmit/receive modules.

8. An antenna array according to claim 7, further comprising:

an antenna housing;

a drive shaft connected at a first end to the antenna housing and at another end to an aircraft body; and a rotary joint disposed along the drive shaft for coupling therethrough electrical power, radio frequency and control signals to the antenna array;

wherein the drive shaft is operable to rotate the antenna assembly through 360°.

9. An antenna array according to claim 1, wherein each group of antenna elements comprises at least two said antenna elements.

10. An antenna array according to claim 9, wherein the groups of phased array antenna elements are provided on lateral structures.

11. An antenna array according to claim 10, wherein the lateral structures are removable from the array.

12. An antenna array according to claim 11, wherein the communication modules are transmit/receive modules.

13. An antenna array according to claim 12, further comprising:

an antenna housing;

a drive shaft connected at a first end to the antenna housing and at another end to an aircraft body; and a rotary joint disposed along the drive shaft for coupling therethrough electrical power, radio frequency and control signals to the antenna array;

wherein the drive shaft is operable to rotate the antenna assembly through 360°.

14. An antenna array according to claim 1, wherein the groups of phased array antenna elements are provided on lateral structures.

15. An antenna array according to claim 14, wherein the lateral structures are removable from the array.

16. An antenna array according to claim 15, wherein the communication modules are transmit/receive modules.

17. An antenna array according to claim 16, further comprising:

an antenna housing;

a drive shaft connected at a first end to the antenna housing and at another end to an aircraft body; and a rotary joint disposed along the drive shaft for coupling therethrough electrical power, radio frequency and control signals to the antenna array;

wherein the drive shaft is operable to rotate the antenna assembly through 360°.

18. An antenna array according to claim 1, wherein the communication modules are transmit/receive modules.

19. An antenna array according to claim 18, further comprising:

an antenna housing;

a drive shaft connected at a first end to the antenna housing and at another end to an aircraft body; and a rotary joint disposed along the drive shaft for coupling therethrough electrical power, radio frequency and control signals to the antenna array;

wherein the drive shaft is operable to rotate the antenna assembly through 360°.

20. An antenna array according to claim 1, further comprising:

an antenna housing;

a drive shaft connected at a first end to the antenna housing and at another end to an aircraft body; and a rotary joint disposed along the drive shaft for coupling therethrough electrical power, radio frequency and control signals to the antenna array;

wherein the drive shaft is operable to rotate the antenna assembly through 360°.

* * * * *